(12) United States Patent
Walter (10) Patent No.: US 6,496,609 B1
(45) Date of Patent: Dec. 17, 2002

(54) HYBRID-LINEAR-BICUBIC INTERPOLATION METHOD AND APPARATUS

(75) Inventor: Andrew Gordon Neil Walter, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/410,819

(22) Filed: Oct. 1, 1999

(30) Foreign Application Priority Data

Nov. 7, 1998 (GB) .............................................. 9824338

(51) Int. Cl.$^7$ ................................................. G06K 9/32

(52) U.S. Cl. ....................................... 382/300; 358/525

(58) Field of Search ................................ 382/300, 299, 382/279, 298; 358/525, 451; 348/441; 708/290

(56) References Cited

U.S. PATENT DOCUMENTS

| | | | | |
|---|---|---|---|---|
| 4,611,348 A | * | 9/1986 | Williams et al. | 382/300 |
| 6,088,062 A | * | 7/2000 | Kanou et al. | 348/441 |
| 6,236,766 B1 | * | 5/2001 | Zavaljevski et al. | 382/300 |

FOREIGN PATENT DOCUMENTS

| | | |
|---|---|---|
| EP | 0 700 015 | 3/1996 |
| WO | WO 90/16035 | 12/1990 |

\* cited by examiner

Primary Examiner—Yon J. Couso
(74) Attorney, Agent, or Firm—Ohlandt, Greeley, Ruggiero & Perle, L.L.P.; Daniel P. Morris (57) ABSTRACT

The invention relates to a method for reducing the computational overhead of bicubic interpolation while still providing a similar level of accuracy. The invention takes into account the fact that sampled points surrounding a point whose value is to be determined have respective first, second and third order effects on the calculated value. The invention combines linear interpolation, ignoring points having a third order effect, with cubic interpolation of points having a first and second order effect to derive the value.

7 Claims, 4 Drawing Sheets

```
+----------------------------> Row direction
|
|       W0    W1    W2    W3
|
|       X0    X1    X2    X3
|
|       Y0    Y1    Y2    Y3
|
|       Z0    Z1    Z2    Z3
|
V
Column direction
```

Instruction Count

|  | exact | 1-D LUT | 2-D LUT |
|---|---|---|---|
| Bilinear | 18 | 16 | 18 |
| Bicubic | 116 | 64 | 66 |
| Invention | 80 | 51 | 50 |

Figure 7

Memory Fetch Instructions

|  | exact | 1-D LUT | 2-D LUT |
|---|---|---|---|
| Bilinear | 4 | 6 | 8 |
| Bicubic | 16 | 24 | 32 |
| Invention | 12 | 21 | 24 |

Figure 8

LUT Space Required

|  | exact | 1-D LUT | 2-D LUT |
|---|---|---|---|
| Bilinear | none | $O(N)$ | $O(4*(N**2))$ |
| Bicubic | none | $O(4*N)$ | $O(16*(N**2))$ |
| Invention | none | $O(5*N)$ | $O(12*(N**2))$ |

Figure 9

HYBRID-LINEAR-BICUBIC INTERPOLATION METHOD AND APPARATUS

FIELD OF THE INVENTION

The present invention relates to a method and component for interpolating data.

BACKGROUND OF THE INVENTION

In the area of image and video processing, there is frequently a need to create new images by re-sampling an original image.

Typical instances are:

a) zooming-in, where there is a need to create more pixels than in the original image;

b) Image-rotation, where new pixels overlap 2 or more of the original pixels; and c) Image-distortion (morphing), where the aim may be to correct lens aberration (barrel, pin-cushion distortion) or even to deliberately introduce distortion.

Several two-dimensional techniques for computing new pixel-values are well known, and used frequently. The most commonly met ones are:

a) Nearest-neighbour
b) Bilinear
c) Bicubic

Nearest-neighbour is extremely simple. It consists of sampling the pixel nearest to the centre of the desired new pixel, and using that value. Unfortunately, it has the undesirable effect of introducing 'jaggies' or 'staircasing'. Consider the case of a horizontal line, 1 pixel wide. This appears to the eye as a perfect, straight line (which it is). If re-sampled using nearest-neighbour, a very-slight image-rotation of a degree or so will convert this line into a highly visible staircase. Further operations will enhance this effect, and can even cause break-up of the original line. This form of interpolation is not considered further, as the quality is very poor.

Bilinear is more complex. It consists of taking the 4 pixels which surround, the position of the new pixel, and computing a new pixel-value based on these 4 neighbours. Whichever pixel is nearest to the new one has most weight. If the new pixel is right in the middle of the 4 neighbours, then it will end up being the average of the 4 pixels. This technique is a considerable improvement on nearest neighbour, but still has some draw-backs. It has the effect of blurring the original image, and losing contrast, as the new pixel's computed value will never lie outside the min-max range of the 4 neighbours.

Bicubic is recognised as being the 'best' quality, as it applies a curve-fit to the pixel-values, and so is attempting to re-construct the original waveform which gave rise to the sampled pixel-values in the original image. Unfortunately, bicubic interpolation is recognised as being expensive computationally.

DISCLOSURE OF THE INVENTION

The present invention provides a new type of interpolation, a hybrid linear-bicubic interpolation, which achieves the quality of a bicubic interpolation, but using some 80% of the computation of traditional bicubic interpolation.

According to the invention there is provided a method of determining an interpolated value for a point lying between second and third rows of an array comprising at least four rows of spatially related points each having respective values, said method comprising the steps of: linearly interpolating between a first two points on said first row to determine a first value at a first location; cubically interpolating between a second two points on said second row in accordance with the rate of change of values at said second two points on said second row to determine a second value at a second location; cubically interpolating between a third two points on said third row in accordance with the rate of change of values at said third two points on said third row to determine a third value at a third location; linearly interpolating between a fourth two points on said fourth row to determine a fourth value at a fourth location; said first, second, third and fourth locations forming a transverse row intersecting said point; and cubically interpolating between said second and third locations in accordance with the rate of change of values at said second and third locations determined according to said first and fourth values to determine said interpolated value.

BRIEF DESCRIPTION OF THE DRAWINGS

An embodiment of the invention will now be described with reference to the accompanying drawings, in which.

DESCRIPTION OF THE PREFERRED EMBODIMENTS

In order to assess the present invention, we need to look at the three prior art techniques using straight calculation as well as 1-dimensional and 2-dimensional lookup-table (LUT) implementations which can be used in practical situations to speed-up the brute-force required by straight calculation.

A little introduction is necessary here to show how one-dimensional linear and cubic interpolation actually work, with and without the use of lookup-tables, and to show the use of simple pseudo-code instructions (such as are found in microprocessors and DSP (Digital Signal Processing) chips).

Figure 1:
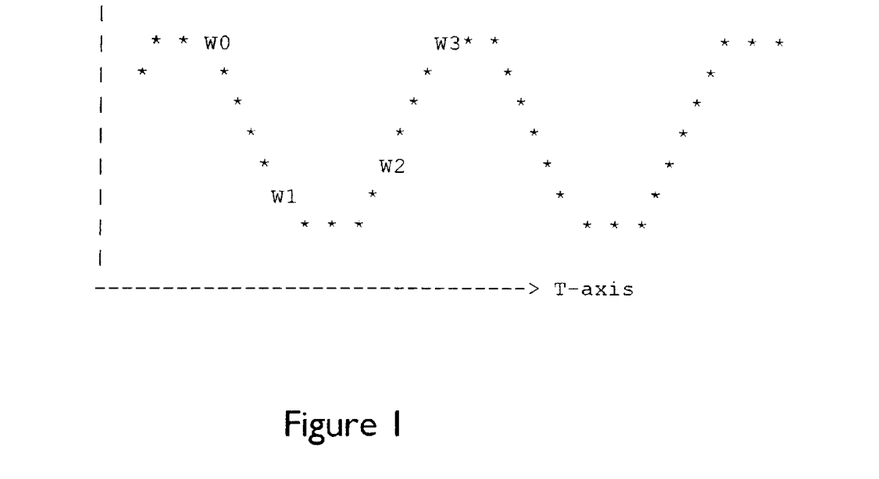
FIG. 1 shows a waveform, which has been sampled at points W0, W1, W2, W3 to generate pixels in an original digital image.

Consider the problem of interpolating new points between existing points, and, in particular, consider a one-dimensional case for simplicity. FIG. 1 shows a waveform, which has been sampled at points W0, W1, W2, W3 to generate pixels in an original digital image. Note that the sampling rate is greater than twice the natural frequency, so the Nyquist requirement is observed, and the frequency can be captured without aliassing it. Because the original image has pixels of equal size, the sampled-values W0, W1, W2, W3 lie at equal intervals along the T-axis. This simplifies the maths, but is not a fundamental limitation on any of the interpolation methods described here.

The requirement now is to generate new pixel values at points along the T axis, between the existing W1 and W2 points.

1-D Linear Interpolation in General

The technique takes a straight line between W1 and W2, and picks off as many points along it as are required. It is convenient to introduce a parameter, here called j, which is the distance along the T axis from the start of the arc (W1 point) to the new required point, FIG. 2.

Figure 2:
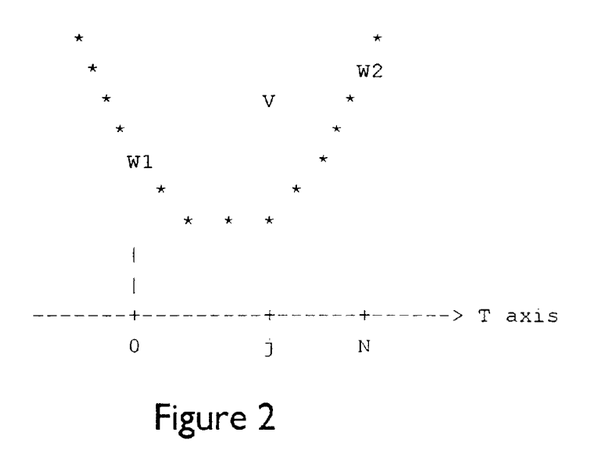
FIG. 2 illustrates a point value V calculated according to linear interpolation.

Also, let N be the distance along T axis between W1 and W2 points. N will in general be a known, predetermined constant value.

V is the new point whose value is to be computed. (The fact that V is a long way from the original curve is simply an indication of the poor quality, corner-cutting behaviour inherent in linear interpolation). The origin of the T-axis is relocated so that:

t=0 at W=W1, t=N at W=W2, t=j at W=V

It is easy to show that:

$$V=(j*W2+(N-j)*W1)/N$$

Consider now the implementation of this technique with regard to real-world requirements, eg the availability or not of floating-point hardware and the use or not of lookup-tables (LUTs). CPU registers will be called names like R0, R1, Rj, RN etc.

N features as a known constant, which is assumed to be held in a register called RN which is read-only, as it is used so often.

Exact 1-D Linear Interpolation without LUT

Rj (=j) is assumed to be known, as a result of some previous morph/lookup/calculation.

RN is known. W1 and W2 are not yet known, and need to be loaded from memory in which the Image is stored. Appendix #1 shows the pseudo-code to implement the technique. This uses 2 load-from-memory, 2 multiply, 1 divide, 3 copy/add/sub instructions, total 8 instructions.

In cases where further calculations are to be done, it's possible to work using N*V as a value, leaving it until later to factor-out N. This saves 1 divide instruction at this stage. Also, note that if it can be chosen that N=1, this also saves the divide instruction entirely.

If the technique is implemented using floating-point hardware, than N=1.0 is easy to specify. If integer hardware is used, than N must be considerably greater than 1, as an integer value of j which lies between 0 and N is required. In this case it makes sense to choose N to be some convenient power of 2, eg 8, 16, 256, whatever gives sufficient resolution. Using powers of 2 means the division by N can be achieved by bit-shifts (if cheaper than divides), or even avoided altogether by selecting high-byte sections of registers and ignoring low byte sections. This is architecture-dependent.

In conclusion, exact 1-D linear interpolation without LUT requires 8 instructions to calculate V, or 7 if N*V is wanted.

1-D Linear Interpolation Using 1-D LUT

In the case of image pixels, typically integer values of W are used. Values from 0 to 255 are most commonly used, as in 8-bit grey-scale images and 24-bit RGB and YUV colour images. The resolution of such values is one part in 256, so the use of floating-point arithmetic is overkill in most cases. It is quite accurate enough to resolve the j value to this same 1 in 256 resolution, in other words, N can be 256 and j restricted to have values 0,1,2, . . . ,255.

Suppose j has been computed as j=127.567: the difference in interpolated pixel-values using floating-point maths and integer-maths with j truncated to 127 will not be visible.

Thus, j is restricted to have a small, finite number of values (e.g. 0 to 255). j=0 will produce V=W1. j=255 will produce something very close to V=W2. (j=256 WILL produce V=W2, but this point should really be generated by interpolation between W2 and W3, with j=0).

For each value of j=0 to j=255, there is now a weighting that can be applied to W1 and W2 values, and a lookup-table can be used to get these, using j as the index into the LUT. As before, Rj (=j) is assumed to be known, RN is known (=N), W1 and W2 are not yet known, and need to be loaded from the image memory.

Appendix #2 shows the pseudo-code to implement the technique where W1 and W2 are multiplied by their weights, summed, and divided to get V. This requires 3 load-from-memory, 2 multiply, 1 divide, 1 add/sub instructions, in total 7 instructions.

In cases where further calculations are to be done, it's possible to work using N*V as a value, leaving it until later to factor-out N. This saves 1 divide instruction at this stage. (Note: N cannot be chosen to be 1, as now using integer values, with N>>1).

In conclusion 1-D linear interpolation using a 1-D LUT requires 7 instructions to calculate V, or 6 if N*V is wanted.

Using a 1-D LUT saves two arithmetic instructions, at the cost of one extra load. The size of the LUT is of the order of N entries (denoted as O(N) size).

1-D Cubic Interpolation in General

The technique takes a curve between W1 and W2, and picks off as many points along it as are required. There are an infinite number of curves which can be drawn through W1 and W2, so the problem is to choose a sensible one which is well-behaved, and amenable to easy computation. There are other requirements placed on the choice of curve; clearly, in the case of the linear interpolation above, there is a slope-discontinuity at W1 and W2 where the previous interpolated-lines join-up. In order to achieve smooth interpolation across new arcs (W0–W1 arc changeover to W1–W2 arc etc) it is required to have slope-continuity at W1 and W2. So, we have 4 conditions, slope-continuity at W1, W2, and position-continuity at W1 and W2. The simplest algebraic curve that meets this is a cubic curve.

The choice of slope at W1 and W2 is somewhat arbitrary; any rule for choosing must be symmetrical with respect to the previous arc, i.e. the slope chosen at the end of the previous arc must be the same as that at the start of the next arc. The simplest choice here is to choose the slope at W1 to be parallel to a line drawn between W0 and W2, and the slope at W2 to be parallel to a line between W1 and W3. So, choose slope at W1=(W2–W0)/(2*N), and similarly choose slope at W2 (W3–W1)/(2*N).

Let "t**3" denote t-cubed.

Let W=W1 at t=0

Let W=W2 at t=N

Let "R2+=R3" denote that R3 is added to contents of R2 register, using "C" notation. Similarly, "R1/=R4" means R1 is divided by R4, etc. Let "R2=LUT[Rj]" denote that Rj is used to index into a table of values (lookup table) called LUT, again using "C" notation.

It can be shown that the section of cubic-curve between W1 and W2 with slopes defined as above is given by the equation:

$$W=(A*(t**3))+(B*(t**2))+(C*t)+D$$

where

A=(W3−3*W2+3*W1−W0)/(2*(N**3))

B=(−W3+4*W2−5*W1+2*W0)/(2*(N**2))

$$C=(W2-W0)/(2*N)$$

$$D=W1$$

Exact 1-D Cubic Interpolation without LUT

As before:

Rj (=j) is assumed to be known,

RN is known (=N),

W0, W1, W2 and W3 are not yet known, and need to be loaded from the image memory.

With simple arranging, it can be shown that we have:

$$2*(N**3)*A=(W3-W0)-3(W2-W1)$$

$$2*(N**2)*B=(W2-W1)-2(N**3)A-W1+W0$$

$$2*N*C=(W2-W0)$$

Appendix #3 shows the pseudo-code to implement the technique. This requires 4 load-from-memory, 6 multiply, 1 divide, 13 copy/add/sub instructions, in total 24 instructions.

Note that some multiplies could be replaced by shifts, if N is a power of 2, depending on CPU instruction-times and the slight loss in freedom to choose N to be any integer/floating-point value.

If floating-point operations are used and n is chosen to be 1.0, then this eliminates 2 multiplies, reducing the count to 22 instructions.

If 2(N3)V can be used in later calculations, then a further 1 division is saved. Using floating-point registers this is no problem. Using integer registers it's likely that this will be a large number, so requiring the division by 2(N3) or at least by N**2 to reduce it to a manageable scale.

In conclusion, exact 1-D cubic interpolation without LUT needs 24 instructions to calculate V, or 23 if 2(N**3)V is wanted without needing any LUT-space.

1-D Cubic Interpolation Using LUT

As per the previous linear interpolation using a LUT, N is specified to be a pre-determined fixed number (eg, but not necessarily=256). For each value of j from 0 to N−1 we can solve for A,B,C,D and substitute for j to get V. For example, at t=N/4 it may be shown that $$V(\text{at } t=N/4)=(-9W0+111W1+29W2-3W3)/128$$

In other words there are 4 weights which need to be multiplied by W0 through to W4, summed, and divided to calculate V. (If floating-point is used, the weights can be pre-divided, saving the final division). 4 LUTs are needed, one each for W0, W1, W2, W3, and each is of size O(N). Call these LUTs LUT0, LUT1, LUT2, LUT3 respectively.

Appendix #4 shows the pseudo-code to implement the technique. This requires 8 load-from-memory, 4 multiply, 1 divide, 3 add instructions, in total 16 instructions.

In conclusion, 1-D cubic interpolation using LUT (Integer) needs 16 instructions to calculate V, or 15 if 2(N**3)V is wanted and needs O(4*N) entry LUT-space.

2-D Interpolation in General

Consider now the 2-dimensional situation based on a 2-D grid of pixel-values. In particular, consider the bicubic situation, as the bilinear case is a simpler subset of the bicubic one. 4 rows of pixels are required, each comprising 4 values. Let these rows be called W, X, Y, Z rows, with values W0–W4, X0–X4, Y0–Y4, Z0–Z4 respectively.

Figure 3:
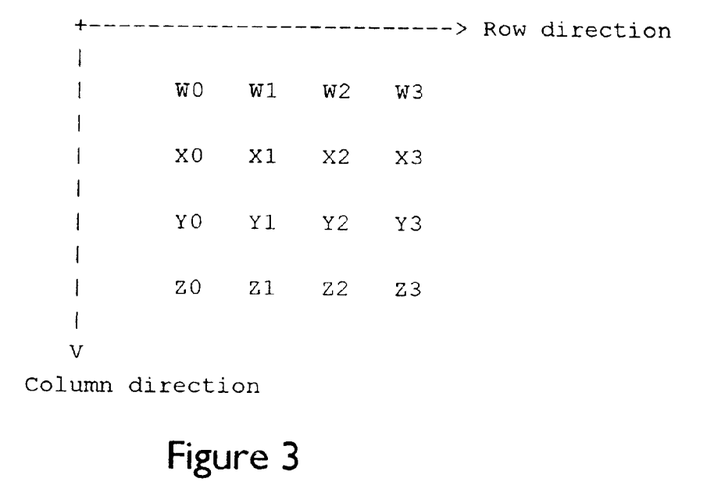
FIG. 3 shows a 2-D grid of points.

FIG. 3 shows a 2-d grid of points. Imagine a flexible rubber-sheet surface passing through 4 points X1, X2, Y1, Y2. The value at each point on the surface corresponds to the height of the sheet at that point. We now need to interpolate one (or more) new points at some pre-calculated point on this surface. As in the 1-D case above, j is defined to be the distance along the Row-axis from the W1/X1/Y1/Z1 column, and similarly k to be the distance down the column axis from the X0/X1/X2/X3 row.

Figure 4:
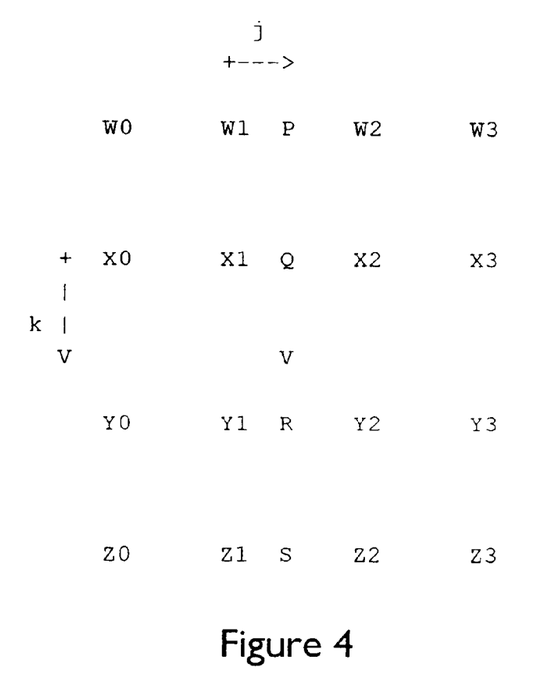
FIGS. 4 and 5 illustrate the location of a point V, whose value is to be calculated, within respective 2-D grids.

Bicubic interpolation requires doing 4 cubic interpolations along each of the 4 rows using the same j value, to calculate 4 new intermediate points called P,Q,R,S in FIG. 4. Using these 4 points, one further cubic interpolation is done in the column-direction using the k value to get the final value V.

Bilinear is similar, but simpler, as only points Q and R are calculated using linear interpolation between X1 and X2, Y1 and Y2, then Q & R are used to calculate V.

Turning to Bicubic interpolation, the use of LUTs presupposes the area between X1, X2, Y1, Y2 is divided into a grid, with a known N number of points in row-direction (or row AND column directions for 2-D LUTS), and new pixels will be taken from nearest grid-points, as before.

If LUTs are used to assist the calculations, then they can be used in two main ways:

Firstly, in a 1-dimensional way, as for the earlier 1-D interpolations, weights can be looked up for points W0, W1, W2, W3. These same weights are used for rows X, Y, Z, as the value j is the same for all 4 rows. New weights must then be looked up for points P,Q,R,S as k will be different from j. So, using 1-D LUTS, there is a lot of re-use of the previously looked-up weights. This requires 1 LUT of size O(N) entries.

Secondly, in a 2-dimensional way, it can be shown (analogously to the 1-D case) that for each value j and k, there is a weight to be applied to each of the 16 points W0 through to Z3. This 2-D lookup table needs N2 entries, and there are 16 such LUTs needed, one for each of X0 through to Z3. (Symmetry can be used to reduce this to 3 LUTS, at the cost of some index-manipulation at runtime). This requires 16 LUTs of size O(N2) entries.

The same applies to the simpler bilinear interpolation, but only 1 LUT of size O(N) entries is required if using 3 1-D linear interpolations, or 4 LUTs of size O(N**2) entries if using 1 single 2-D interpolation.

Consider now the instructions required to perform 2-D interpolation using straightforward calculations, bilinear and bicubic methods, 1-D and 2-D LUTS.

Exact Bilinear Interpolation without LUT

Figure 5:
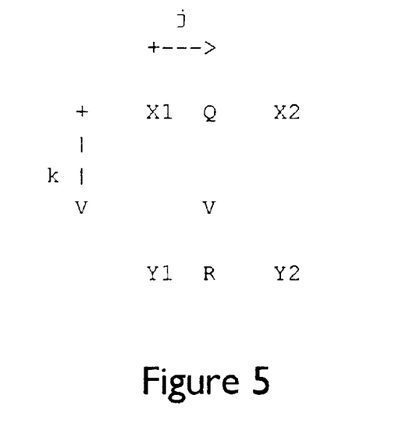

Referring to exact 1-D linear interpolation without LUT, and FIGS. 5, 7 instructions are used to calculate value N*Q between points X1 and X2.

Appendix #5 shows the pseudo-code to implement the technique. After getting Q along the X1–X2 row, N*Q will not be huge, so it can be assumed no division by N is required until interpolating along Q to R. This requires 4 load-from-memory, 6 multiply, 1 divide, 7 copy/add/sub instructions, in total 18 instructions.

An alternative is to work it out brute-force algebraically, where it may be shown that:

$$V=((N-j)(N-k)X1+j(N-k)X2+(N-j)kY1+jkY2)/(N**2)$$

This can be implemented as shown in Appendix #6, where N**2 is either a known constant, or already loaded into a register.

In all this uses 4 load-from-memory, 6 multiply, 1 divide, 7 copy/add/sub instructions, in total 18 instructions. It is also more suited to built-in matrix instructions designed into the instruction-set of some chips.

In conclusion, exact bilinear interpolation without LUT needs 18 instructions to calculate V and needs no LUT space.

Bilinear Interpolation Using 1-D LUT

Referring to linear interpolation using 1-D LUT, 6 instructions are required to calculate value N*Q between points X1 and X2.

Appendix #7 shows the pseudo-code to implement the technique. In all this uses 6 load-from-memory, 6 multiply, 1 divide, 3 copy/add/sub instructions, in total 16 instructions, so no improvement.

The alternative is to work it out brute-force algebraically, where it may be shown that $V=((N-j)(N-k)X1+j(N-k)X2+(N-j)kY1+jkY2)/(N^{**}2)$. This can be implemented as shown in Appendix #8. In all this uses 6 load-from-memory, 6 multiply, 1 divide, 3 copy/add/sub instructions, in total 16 instructions, so again, no improvement.

In conclusion, bilinear interpolation using 1-D LUT needs 16 instructions to calculate V and needs O(N) entry LUT-space.

Bilinear Interpolation Using 2-D LUT

As shown above, it is possible using 4 separate LUTs to lookup the weights to be applied to each of X1, X2, Y1, Y2, using a single common indexing value. This index value is a function of both j and k, and each of these LUTS is of $O(N^{**}2)$ size. Let these LUTs be called LUT0, LUT1, LUT2, LUT3.

Appendix #9 shows the pseudo-code to implement this. In all this uses 8 load-from-memory, 5 multiply, 1 divide, 4 copy/add/sub instructions, in total 18 instructions.

In conclusion, bilinear interpolation using 2-D LUT needs 18 instructions to calculate V and needs $O(4^*(N^{**}2))$ entry LUT-space.

Exact Bicubic Interpolation without LUT

Referring to exact 1-D cubic interpolation without LUT, 24 instructions are required to calculate value P between points W1 and W2.

Appendix #10 shows the pseudo-code to implement the technique. This includes 24 instructions. The same code needs to be repeated for each of the W, Y, Z rows similarly, to calculate points Q,R,S. So far this costs 4*24=96 instructions.

There is then the fifth cubic interpolation to be done in a column-direction, using points P,Q,R,S and t=k [Rk] as the variable. P,Q,R,S do not need to be loaded from memory as they have just been calculated, so 4 loads are saved on this column-interpolation. So, a further 20 instructions are used, to give final tally of (4*24)+20=116 instructions.

In all this uses 16 load-from-memory, 30 multiply, 5 divide, 65 copy/add/sub instructions. (If floating-point registers are used, 4 divides can be skipped at end of each row-interpolation, and the scaling done at end of the column interpolation, so saving a further 4 divide instructions, but the above allows for integer-register usage).

In conclusion, exact bicubic interpolation without LUT needs 116 instructions to calculate V and needs no LUT space.

Bicubic Interpolation Using 1-D LUT

Referring to 1-D cubic interpolation using LUT, 16 instructions are required instructions to calculate value P between points W1 and W2.

Appendix #11 shows the pseudo-code to implement the technique including 16 instructions. The same code needs to be repeated for each of the W, Y, Z rows similarly, to calculate points Q,R,S. The 4 weights don't need to be re-loaded as they are the same, so 4 loads are saved on each of these 3 rows. So far this costs 16+(3*12)=52 instructions.

There is then the fifth cubic-interpolation to be done in a column-direction, using points P,Q,R,S and t=k [Rk] as the variable. P,Q,R,S don't need to be loaded from memory as they have just been calculated, so 4 loads are saved on this column-interpolation, but 4 loads are needed to get new weights. So, a further 12 instructions are used to give final tally of 16+(3*12)+12=64 instructions.

In all this uses 24 load-from-memory, 20 multiply, 5 divide, 15 add instructions.

(If floating-point registers are used, 4 divides can be skipped at end of each row-interpolation, and the scaling done at end of the column interpolation, so saving a further 4 divide instructions, but integer-register usage is allowed for).

In conclusion, bicubic interpolation using 1-D LUT needs 64 instructions to calculate V and needs O(4*N) entry LUT-space.

Bicubic Interpolation Using 2-D LUT

This is similar to the bilinear interpolation using a 2-D LUT technique, except 16 LUTs are needed, each with the weights to be applied to the 16 points W0 through to Z3.

Appendix #13 shows the technique. In all this uses 32 load-from-memory, 17 multiply, 1 divide, 16 add instructions, total 66 instructions. Floating-point math would save the final divide, by storing pre-scaled weights in the LUTs.

In conclusion, bicubic interpolation using 2-D LUT needs 66 instructions to calculate V and needs $O(16^*(N^{**}2))$ entry LUT-space.

Hybrid-Linear-Bicubic Interpolation in General

Referring to FIG. 4, it is clear from earlier sections that points X1, X2, Y1, Y2 have the most importance in determining the value V. This is because they are the closest points to V, and also because the bicubic rubber-sheet passes precisely through these 4 points. To a first approximation, if the values at each of X1, X2, Y1, Y2 were increased by some small delta, then we expect the interpolated value at V to increase by an amount very close to delta. Thus, it can be said that alterations to the values at X1, X2, Y1, Y2 have a first order effect on V.

As part of calculating V, Q and R are first calculated. Consider the calculation of point Q. Again, X1 and X2 have a first-order effect on Q. Points X0 and X3 are used only to help calculate the slope of the curve at X1 and at X2. Consider the calculation of slope at point X1. For ease of calculation and slope-continuity, the slope is typically chosen to be a symmetrical function, and one such function sets the slope to be the same as the slope of a straight line between X0 and X2, i.e. slope at X1=(X2−X0)/2N.

Other functions could equally well be chosen, for example an arc of a circle passing through X0, X1, X2 would also do, though it's more complicated to calculate. It can be seen that the exact choice of slope at X1 is somewhat arbitrary, and that almost any "reasonable" choice will do. We can never know whether the "true" original curve through X0, X1, X2, X3 was a cubic, a sine-wave, or some other analytic or even non-analytic function.

So, it can be seen that varying X0 changes the slope at X1, and has a second-order effect on the calculation of Q, not a first-order effect. The same applies to X3, Y0, and Y3.

The same argument applies to the calculation of it points P and S. P and S each have second-order effects on V, not first-order.

In the pure bicubic interpolation, as described above, points P and S are calculated using cubic interpolation, which is expensive. Consider point P. Points W1 and W2 have a first-order effect on P, and so have a second-order effect on V, as point P itself only has 2nd-order effect on V.

Points W0 and W3 have second-order effects on P, and so have only 3rd order effects on V. The same applies to points Z0 and Z3. It is hardly worth wasting significant instructions calculating these 3rd-order effects, as 2nd-order assumptions and approximations (the slope at X0,X1,Y0,Y1 assumptions) will dwarf any such 3rd-order effects.

So, the present invention ignores these outermost points W0, W3, Z0, Z3, and uses linear interpolation to calculate points P and S. This leads to significant simplification and hence to lower implementation costs, both in instructions saved, and bandwidth required to load values, and hence to less silicon real-estate being required.

As the significant heart of the technique is still cubic-based, there is no detectable loss in quality as compared to "pure" bicubic interpolation.

Three implementations of the invention will be described below:

Exact Hybrid-Linear-Bicubic Interpolation without LUT

Figure 6:
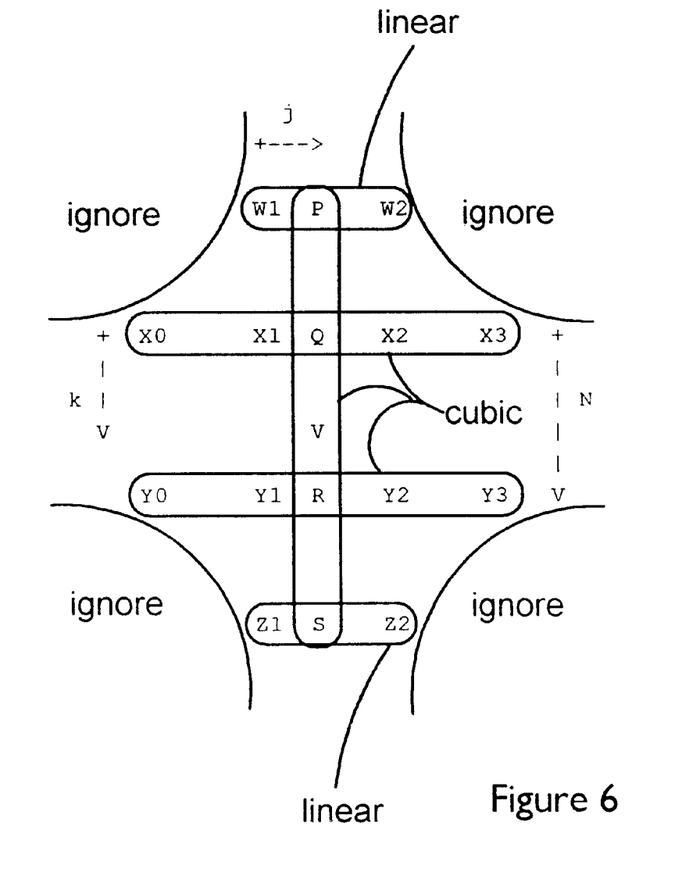
FIG. 6 illustrates the sequence of interpolations according to the invention to calculate the value at point V.

Referring now to FIG. 6, j and k are assumed to be known, as is N, the inter-pixel spacing.

j, k and N are held in registers Rj, Rk, RN respectively.

RP and RS are two registers, just like the other R0,R1 . . . registers.

W1 through to Z2 are not yet known, and need to be loaded from the image memory.

Appendix #12 shows the pseudo-code to implement the technique.

After getting S along the Z1–Z2 row, N*P will be in register RP, and N*S in register RS. So far, N*P and N*S calculations have cost 12 instructions.

Cubic interpolation is then applied to get Q and R, along X and Y rows respectively. This is similar to code described in relation to exact bicubic interpolation without LUT, with slightly different scaling at the end to calculate N*Q rather than Q. N*Q calculation has cost 24 instructions.

Similar code is run to calculate N*R on the Y row, costing another 24 instructions.

Using N*P, N*Q, N*R, N*S in registers calculated above, a column-direction cubic interpolation is done to calculate V. 4 load instructions are saved, and the final division will be division by 2(N**4). This interpolation of V costs 20 instructions.

Overall cost is 12+24+24+20=80 instructions, which is broken down into 12 load-from-memory, 22 multiply, 3 divide, 43 copy/add/sub instructions.

In conclusion, the embodiment of the invention without LUT needs 80 instructions to calculate V and needs no LUT space.

Hybrid-Linear-Bicubic Interpolation Using 1-D LUT

This employs a combination of the code described in relation to both bilinear interpolation using 1-D LUT, and bicubic interpolation using 1-D LUT.

Appendix #14 shows the pseudo-code to implement the technique. Having calculated S along the Z1–Z2 row, N*P is already in register RP, and N*S in register RS. N*P and N*S calculations have cost 11 instructions. Cubic interpolation is then applied to get Q and R, along X and Y rows respectively. This is similar to the code described in relation to bicubic interpolation using 1-D LUT—again note slightly different scaling to calculate N*Q rather than Q. N*Q calculation has cost 16 instructions.

Similar code is run to calculate N*R on the Y row, costing another 12 instructions, as the 4 LUT values are re-used, they don't need to be reloaded.

Using N*P, N*Q, N*R, N*S in registers calculated above, a column-direction cubic interpolation is used to calculate V. Again 4 load instructions are saved, but 4 LUT lookup-instructions need to be done. The final division will be division by 2 (N**4). This interpolation of V costs 12 instructions.

Overall cost is 11+16+12+12=51 instructions, which is broken down into 21 load-from-memory, 16 multiply, 3 divide, 11 copy/add/sub instructions. 1 LUT is needed for the linear-interpolation, and 4 for the cubic stages.

In conclusion, the embodiment of the invention using 1-D LUT needs 51 instructions to calculate V and needs O(5*N)) entry LUT-space.

Hybrid-Linear-Bicubic Interpolation Using 2-D LUT

This is similar to bicubic interpolation using 2-D LUT. But now only 12 points and 12 weights need to be looked up, not 16.

Appendix #15 shows the pseudo-code to implement the technique. This requires 24 load-from-memory, 13 multiply, 1 divide, 12 add instructions, total is 50 instructions. Floating-point math would save the final divide, by storing pre-scaled weights in the LUTs.

In conclusion, hybrid-linear-bicubic interpolation using 2-D LUT needs 50 instructions to calculate V and needs O(12*(N**2)) entry LUT-space.

Overall Conclusion

Figure 7:
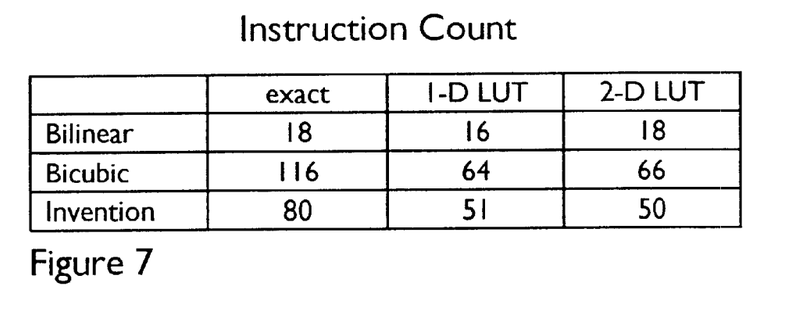
FIGS. 7 to 9 show the performance of the invention versus prior art methods in terms of Instructions Count, Memory-Fetch (load) instructions and LUT space required.
Figure 8:
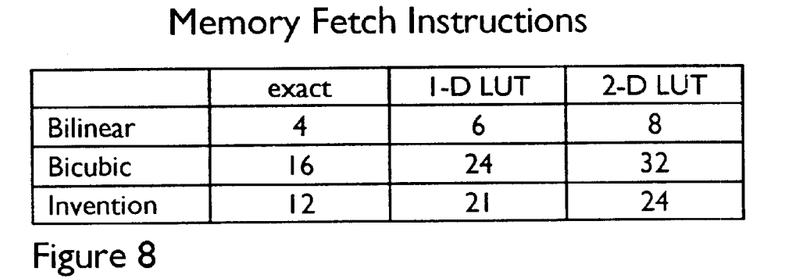
Figure 9:
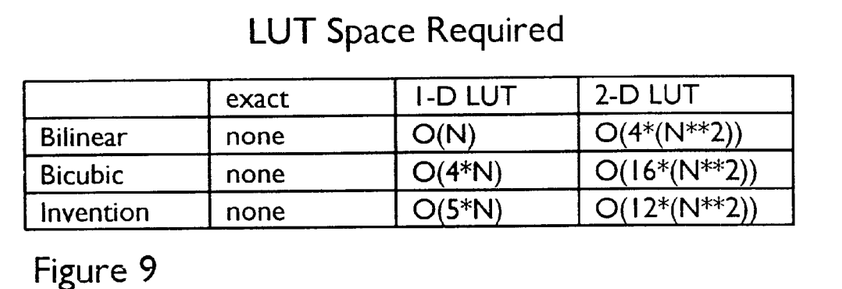

FIGS. 7 to 9 illustrate the above conclusions.

In all cases using 1-D LUTs brings an improvement in instruction count, significantly so in the case of the Bicubic interpolation and in the case of the invention. The methods using 2-D LUTs do not have any significant instruction-savings over those using 1-D LUTs, and as they are much more expensive in space requirements (e.g. if N=256, bicubic using 1-D LUT takes 256 entries, against 16*256*256= 1,048,576 entries). 2-D LUTs are probably not worth implementing, unless their lower cost in multiplications or greater potential to be parallelised is significant.

So the use of 1-D LUTs is recommended, and their storage-use of order N entries is very small.

Bicubic Versus Bilinear Interpolation

The fastest Bilinear uses 16 instructions, of which 6 are memory fetches. The fastest Bicubic uses 64 instructions, of which 24 are memory-fetches. Bicubic is 4× more costly than Bilinear for instructions, and is 4× more costly for memory-fetches.

Invention Versus Bilinear

The fastest Bilinear uses 16 instructions, of which 6 are memory fetches. The best embodiment uses 51 instructions, of which 21 are memory-fetches. Hybrid-linear-bicubic is 3.2× more costly than Bilinear for instructions, and is 3.5× more costly for memory-fetches.

Invention Versus Bicubic Interpolation

The best embodiment uses 51 instructions, of which 21 are memory-fetches. The fastest Bicubic uses 64 instructions, of which 24 are memory-fetches. Bicubic is 1.25× more costly than the invention for instruction, and is 1.14× more costly for memory-fetches.

So, the invention uses 80% of the instructions and 88% of the memory fetches of the traditional bicubic technique. This is a significant saving. The only penalty is the use of 5 rather than 4 lookup-tables, which is insignificant.

It will be seen that the present invention need not be implemented in exactly the manner described above. For example, the linear interpolation could be done in the k direction, FIG. 6, with the final cubic interpolation being done in the j direction. It will be seen, however, that where points are acquired in rows running in the j direction, eg a television signal, it is possible using the preferred embodiment to carry out the interpolations on the first three rows as they are acquired, thus reducing the time after point values are acquired before an interpolated result is generated.

It will also been seen that the spacing of points on the rows need not be the same. This of course makes the mathematics more complex but does not take away from the operation of the invention which combines linear and cubic interpolation in an efficient yet accurate manner.

Similarly, the points P,Q,R,S need not be located in a row running at 90 degrees to the W,X,Y,Z rows—any transverse row will do, although accuracy is reduced as the P,Q,R,S row becomes more parallel to the W,X,Y,Z rows.

The above description has related to the implementation of the invention in a 2-dimensional manner. It will be seen, however, that the invention applies equally to systems of higher dimension.

Using either the prior art or the present invention, a 3D (tricubic) interpolation can be performed by reduction to a 2D problem, then reduction from 2D to 0D (the point 'V'), or alternatively by reduction from 3D to 1D, followed by cubic interpolation from 1D (4 points) to 0D (point 'V'). Similar techniques apply to yet higher dimensions.

Prior Art Tricubic Interpolation 3D to 1D Then 1D to 0D

Using each of the four layers (each including a grid as in FIG. 3) in turn, perform 4 bicubic interpolations to reduce from 4*16=64 points down to 4 new points, then perform one cubic interpolation to reduce from 4 new points to the final point. 64 points contribute to this calculation.

Prior Art Tricubic Interpolation 3D to 2D Then 2D to 0D

Using each of the 16 parallel rows in turn, perform 16 cubic interpolations to reduce from 16*4=64 points down to 16 new points, then perform one bicubic interpolation to reduce from 16 new points to the final point. 64 points contribute to this calculation.

Tricubic Interpolation 3D to 1D Then 1D to 0D Using the Invention

Using the middle 4 points of each of the outer two layers, perform 2 bilinear interpolations to reduce from 8 points to 2 new points, and using the two middle layers, perform 2 hybrid-linear-bicubic interpolations according to the invention to reduce from 2*12=24 points down to 2 new points, then perform one cubic interpolation to reduce from these 4 new points to the final one point. 32 points contribute to this calculation.

Tricubic Interpolation 3D to 2D Then 2D to 0D Using the Invention

Choose 4 sides of the cube which form a hollow tube, and using the middle 4 points of each of these 4 sides perform 8 linear interpolations, all going in the same direction, so that we now have 8 co-planar new points. Using the remaining 2 faces of the cube, choose the central 4 points of each of these 2 faces, and also the central 4 points of the middle 2 layers. Using these 16 points (which form 4 rows of 4 points each), perform 4 cubic interpolations to calculate 4 more new points. These 4 new points are co-planar with the 8 points generated earlier. Using these 12 co-planar points, perform a 2D hybrid-linear-bicubic interpolation according to the invention to calculate the final point. 32 points contribute to this calculation and so the savings of using the invention for either method are clear.

It will be seen that the invention can be implemented in many forms and applications, such as in a digital signal processing chip, in graphics application software or anywhere one needs to interpolate information.

| CODE | COMMENTS |
|---|---|
| Appendix #1 Exact 1-D Linear Interpolation without LUT | |
| R1 = W1 | Load W1 from memory |
| R2 = W2 | Load W2 from memory |
| R2 *= Rj | R2 = W2*j |
| R3 = RN | Copy from register |
| R3 -= Rj | R3 = (N - j) |
| R1 *= R3 | R1 = (N - j)*W1 |
| R1 += R2 | R1 = (W2*j + (N - j)*W1) = N*V |
| R1 /= RN | R1 = (((W2*j + (N - j)*W1))/N) = V |
| Appendix #2 Exact 1-D Linear Interpolation with LUT | |
| R1 = W1 | Load W1 from memory |
| R2 = W2 | Load W2 from memory |
| R2 *= Rj | R2 = W2*j |
| R3 = LUT[Rj] | Lookup (N - j) in one indexed load |
| R1 *= R3 | R1 = (N - j)*W1 |
| R1 += R2 | R1 = (W2*j + (N - j)*W1) = N*V |
| R1 /= RN | R1 = (((W2*j + (N - j)*W1))/N) = nV |
| Appendix #3 Exact 1-D Cubic Interpolation without LUT | |
| R0 = W0 | Load W0 from memory |
| R1 = W1 | Load W1 from memory R1 = D |
| R2 = W2 | Load W2 from memory |
| R3 = W3 | Load W3 from memory |
| R3 -= R0 | R3 = (W3 - W0) |
| R4 = R2 | copy. R4 = W2 |
| R2 -= R1 | R2 = (W2 - W1) |
| R3 -= R2 | |
| R3 -= R2 | |
| R3 -= R2 | R3 = (W3 - W0) - 3(W2 - W1) = 2(N**3)A |
| R4 -= R0 | R4 = (W2 - W0) = 2*N*C |
| R2 -= R3 | R2 = (W2 - W1) - 2(N**3)A |
| R2 -= R1 | R2 = (W2 - W1) - 2(N**3)A - W1 |
| R2 += R0 | R2 = (W2 - W1) - 2(N3)A - W1 + W0 = 2(N2)B |
| We have A, B, C, D scaled by powers of N. Evaluate at t = j. | |
| R3 *= Rj | R3 = 2(N**3)A * j |
| R2 *= RN | R2 = 2(N**3)B |
| R3 += R2 | R3 = (2(N3)Aj + 2(N3)B) |
| R3 *= Rj | R3 = (2(N3)Aj + 2(N3)B) * j |
| R4 *= (N2) | R4 = 2(N3)C.N**2 either a constant or in some register |
| R3 += R4 | R3 = (((2(N3)Aj + 2(N3)B)*j) + 2(N**3)C) |
| R3 *= Rj | R3 = ((((2(N3)Aj + 2(N3)B)*j) + 2(N**3)C) *j) |
| R1 *= 2(N3) | R1 = 2(N3)D.2(N**3) either a constant or in some reg'r |
| R3 += R1 | R3 = ((((2(N3)Aj + 2(N3)B)*j) + 2(N**3)C)*j) + 2(N**3)D |
| R3 /= 2(N3) | R3 = A(j3) + B(j**2) + C(j) + D = V = Value wanted. |
| Appendix #4 Exact 1-D Cubic Interpolation with LUT | |
| R0 = W0 | Load W0 from memory |
| R1 = W1 | Load W1 from memory R1 = D |
| R2 = W2 | Load W2 from memory |
| R3 = W3 | Load W3 from memory |
| R4 = LUT0[Rj] | Load weight for W0 from memory |
| R5 = LUT1[Rj] | |
| R6 = LUT2[Rj] | |
| R7 = LUT3[Rj] | |
| R0 *= R4 | multiply each W by its weight |
| R1 *= R5 | |
| R2 *= R6 | |
| R3 *= R7 | |
| R0 += R1 | |
| R0 += R2 | |
| R0 += R3 | R0 is the sum of all 4 weighted points typically = 2(N**3)V |
| R0 /= 2(N**3) | Scale the result (if using integer maths). |
| Appendix #5 Exact Bilinear Interpolation without LUT | |
| R1 = X1 | Load X1 from memory |
| R2 = X2 | Load X2 from memory |
| R2 *= Rj | R2 = X2*j |
| R4 = RN | Copy from register |
| R4 -= Rj | R4 = (N - j) |
| R1 *= R4 | R1 = (N - j)*X1 |
| R1 += R2 | R1 = (X2*j + (N - j)*X1) = N*Q |

| CODE | COMMENTS |
|---|---|
| Repeat, very similarly, to get R along Y1–Y2 row: | |
| R2 = Y1 | Load Y1 from memory |
| R3 = Y2 | Load Y2 from memory |
| R3 *= Rj | R3 = Y2*j |
| R2 *= R4 | R2 = (N – j)*Y1 |
| R2 += R3 | R2 = (Y2*j + (N – j)*Y1) = N*R |
| Interpolate along Q to R: | |
| R2 *= Rk | R2 = NR*k |
| R4 = RN | Copy from register |
| R4 –= Rk | R4 = (N – k) |
| R1 *= R4 | R1 = (N – k)*NQ |
| R1 += R2 | R1 = (NR*k + (N – k)*NQ) = (N**2)V |
| R1 /= (N**2) | R1 = (((NR*k + (N – k)*NQ))/(N**2)) = V |
| Appendix #6 Alternative Exact Bilinear Interpolation without LUT | |
| R1 = X1 | Load X1 from memory |
| R2 = X2 | Load X2 from memory |
| R3 = Y1 | Load Y1 from memory |
| R4 = Y2 | Load Y2 from memory |
| R5 = RN | Copy N |
| R6 = RN | Copy N |
| R5 –= Rj | R5 = (N – j) |
| R6 –= Rk | R6 = (N – k) |
| R1 *= R5 | R1 = (N – j)X1 |
| R2 *= Rj | R2 = jX2 |
| R1 += R2 | R1 = (N – j)X1 + jX2 |
| R1 *= R6 | R1 = (N – j)(N – k)XT + j(N – k)X2 |
| R3 *= R5 | R3 = (N – j)Y1 |
| R4 *= Rj | R4 = jY2 |
| R3 += R4 | R3 = (N – j)Y1 + jY2 |
| R3 *= Rk | R3 = (N – j)kY1 + jkY2 |
| R3 += R1 | |
| R3 /= (N**2) | R3 = V |
| Appendix #7 Exact Bilinear Interpolation with LUT | |
| R1 = X1 | Load X1 from memory |
| R2 = X2 | Load X2 from memory |
| R2 *= Rj | R2 = X2*j |
| R4 = LUT[Rj] | Lookup (N – j) in one indexed load |
| R1 *= R4 | R1 = (N – j)*X1 |
| R1 += R2 | R1 = (X2*j + (N – j)*X1) = N*Q |
| Repeat, very similarly, to get R along Y1–Y2 row: | |
| R2 = Y1 | Load Y1 from memory |
| R3 = Y2 | Load Y2 from memory |
| R3 *= Rj | R3 = Y2*j |
| R2 *= R4 | R2 = (N – j)*Y1 |
| R2 += R3 | R2 = (Y2*j + (N – j)*Yj) = N*R |
| Interpolate along Q to R: | |
| R2 *= Rk | R2 = NR*k |
| R4 = LUT[Rk] | Lookup (N – k) in one indexed load |
| R1 *= R4 | R1 = (N – k)*NQ |
| R1 += R2 | R1 = (NR*k + (N – k)*NQ) = (N**2)V |
| R1 /= (N**2) | R1 = (((NR*k + (N – k)*NQ))/(N**2)) = V |
| Appendix #8 Alternative Exact Bilinear Interpolation with LUT | |
| R1 = X1 | Load X1 from memory |
| R2 = X2 | Load X2 from memory |
| R3 = Y1 | Load Y1 from memory |
| R4 = Y2 | Load Y2 from memory |
| R5 = LUT[Rj] | Lookup (N – j) in one indexed load |
| R6 = LUT[Rk] | Lookup (N – k) in one indexed load |
| R1 *= R5 | R1 = (N – j)X1 |
| R2 *= Rj | R2 = jX2 |
| R1 += R2 | R1 = (N – j)X1 + jX2 |
| R1 *= R6 | R1 = (N – j)(N – k)X1 + j (N – k)X2 |
| R3 *= R5 | R3 = (N – j)Y1 |
| R4 *= Rj | R4 = jY2 |
| R3 += R4 | R3 = (N – j)Y1 + jY2 |
| R3 *= Rk | R3 = (N – j)kY1+ jkY2 |
| R1 += R3 | R1 = (N – j)(N – k)X1 + j(N – k)X2 + (N – j)kY1 + jkY2 |
| R3 /= (N**2) | R3 = V |
| Appendix #9 Bilinear Interpolation using 2-D LUT | |
| Rj *= N | Start making a 2-D index . . . |
| Rj += Rk | Rj is now a 2-D index, and has N**2 possible values. |
| R1 = X1 | Load Xi from memory |

| CODE | COMMENTS |
|---|---|
| R2 = X2 | Load X2 from memory |
| R3 = Y1 | Load Y1 from memory |
| R4 = Y2 | Load Y2 from memory |
| R5 = LUT0[Rj] | Lookup weight for X1 in one indexed load |
| R6 = LUT1[Rj] | Lookup weight for X2 in one indexed load |
| R7 = LUT2[Rj] | Lookup weight for Y2 in one indexed load |
| R8 = LUT3[Rj] | Lookup weight for Y2 in one indexed load |
| R1 *= R5 | R1 = (N – j)(N – k)X1 |
| R2 *= R6 | R2 = j(N – j)X2 |
| R3 *= R7 | R3 = (N – j)kY1 |
| R4 *= R8 | R4 = jkY2 |
| R1 += R2 | |
| R1 += R3 | |
| R1 += R4 | sum the 4 weighted points |
| R1 /= (N**2) | R1 = V |
| Appendix #10 Exact Bicubic Interpolation without LUT | |
| R0 = W0 | Load W0 from memory |
| R1 = W1 | Load W1 from memory R1 = D |
| R2 = W2 | Load W2 from memory |
| R3 = W3 | Load W3 from memory |
| R3 –= R0 | R3 = (W3 – W0) |
| R4 = R2 | copy. R4 = W2 |
| R2 –= R1 | R2 = (W2 – W1) |
| R3 –= R2 | |
| R3 –= R2 | |
| R3 –= R2 | R3 = (W3 – W0) – 3(W2 – W1) = 2(N**3)A |
| R4 –= R0 | R4 = (W2 – W0) = 2*N*C |
| R2 –= R3 | R2 = (W2 – W1) – 2(N**3)A |
| R2 –= R1 | R2 = (W2 – W1) – 2(N**3)A – W1 |
| R2 += R0 | R2 = (W2 – W1) – 2(N3)A – W1 + W0 = 2(N2)B |
| We have a, b, c, d scaled by powers of N. Evaluate at t = j. | |
| R3 *= Rj | R3 = 2(N**3)A * j |
| R2 *= RN | R2 = 2(N**3)B |
| R3 += R2 | R3 = (2(N3)Aj + 2(N3)B) |
| R3 *= Rj | R3 = (2(N3)Aj + 2(N3)B) * j |
| R4 *= (N2) | R4 = 2(N3)C .N**2 either a constant or in some register |
| R3 += R4 | R3 = (((2(N3)Aj + 2(N3)B)*j) + 2(N**3)C) |
| R3 *= Rj | R3 = ((((2(N3)Aj + 2(N3)B)*j) + 2(N**3)C) *j) |
| R1 *= 2(N3) | R1 = 2(N3)D .2(N**3) either a constant or in some reg'r |
| R3 += R1 | R3 = ((((2(N3)Aj + 2(N3)B)*j) + 2(N**3)C)*j) + 2(N**3)D |
| R3 /= 2(N3) | R3 = A(j3) + B(j**2) + C(j) + D = P = Value wanted on 1st row. |
| Repeat the above for each of the X, Y, Z rows to calculate points Q, R, S. | |
| Then, perform a cubic interpolation using points P, Q, R, S with t = k (in Rk) to get final point V. | |
| Appendix #11 Bicubic Interpolation using 1-D LUT | |
| R0 = W0 | Load W0 from memory |
| R1 = W1 | Load W1 from memory R1 = D |
| R2 = W2 | Load W2 from memory |
| R3 = W3 | Load W3 from memory |
| R4 = LUT0[Rj] | Load weight for W0 from memory |
| R5 = LUT1[Rj] | |
| R6 = LUT2[Rj] | |
| R7 = LUT3[Rj] | |
| R0 *= R4 | multiply each W by its weight |
| R1 *= R5 | |
| R2 *= R6 | |
| R3 *= R7 | |
| R0 += R1 | |
| R0 += R2 | |
| R0 += R3 | R0 is the sum of all 4 weighted points typically = 2(N**3)V |
| R0 /= 2(N**3) | Scale the result (if using integer maths). |
| Repeat the above for each of the X, Y, Z rows to calculate points Q, R, S, re-using the already-loaded weights from the LUTs. | |
| Then, perform a cubic interpolation using points P, Q, R, S with t = k (in Rk) to get final point V. | |
| Appendix #12 Exact Hybrid-Linear-BiCubic Interpolation without LUT | |
| RP = W1 | Load W1 from memory |
| R2 = W2 | Load W2 from memory |

-continued

| CODE | COMMENTS |
|---|---|
| R2 *= Rj | R2 = W2*j |
| R4 = RN | Copy from register |
| R4 -= Rj | R4 = (N − j) |
| RP *= R4 | RP = (N − j)*W1 |
| RP += R2 | RP = (W2*j + (N − j)*W1) = N*P |

N*P will not be huge, so we can assume we don't need to divide by N yet.
Repeat, very similarly, to get S along Z1–Z2 row

| | |
|---|---|
| RS = Z1 | Load Z1 from memory |
| R3 = Z2 | Load Z2 from memory |
| R3 *= Rj | R3 = Z2*j |
| RS *= R4 | RS = (N − j)*Z1 |
| RS += R3 | RS = (Z2*j + (N − j)*Z1) = N*S |

Do a Cubic interpolation to get Q along X row

| | |
|---|---|
| R0 = X0 | Load X0 from memory |
| R1 = X1 | Load X1 from memory R1 = D |
| R2 = X2 | Load X2 from memory |
| R3 = X3 | Load X3 from memory |
| R3 -= R0 | R3 = (X3 − X0) |
| R4 = R2 | copy. R4 = X2 |
| R2 -= R1 | R2 = (X2 − X1) |
| R3 -= R2 | |
| R3 -= R2 | |
| R3 -= R2 | R3 = (X3 − X0) − 3(X2 − X1) = 2(N**3)A |
| R4 -= R0 | R4 = (X2 − X0) = 2*N*C |
| R2 -= R3 | R2 = (X2 − X1) − 2(N**3)A |
| R2 -= R1 | R2 = (X2 − X1) − 2(N**3)A − X1 |
| R2 += R0 | R2 = (X2 − X1) − 2(N3)A − X1 + X0 = 2(N2)B |

We have A, B, C, D scaled by powers of N. Evaluate at t = j.

| | |
|---|---|
| R3 *= Rj | R3 = 2(N**3)A * j |
| R2 *= RN | R2 = 2(N**3)B |
| R3 += R2 | R3 = (2(N3)Aj + 2(N3)B) |
| R3 *= Rj | R3 = (2(N3)Aj + 2(N3)B) * j |
| R4 *= (N2) | R4 = 2(N3)C .N**2 either a constant or in some register |
| R3 += R4 | R3 = (((2(N3)Aj + 2 (N3)B) *j) + 2(N**3)C) |
| R3 *= Rj | R3 = ((((2(N3)Aj + 2(N3)B) *j) + 2(N**3)C) *j) |
| R1 *= 2(N3) | R1 = 2(N3)D .2(N**3) either a constant or in some reg'r |
| R3 += R1 | R3 = ((((2(N3)Aj + 2(N3)B)*j) + 2(N**3)C)*j) + 2(N**3)D |
| R3 /= 2(N2) | R3 = (A(j3) + B(j**2) + C(j) + D)*N = N*Q. |

Repeat the above cubic code for the Y row to calculate point R.
Then, perform a cubic interpolation using points P, Q, R, S with t = k (in Rk) to get final point V.

Appendix #13 Bicubic Interpolation Using 2-D LUT

| | |
|---|---|
| Rj *= N | Start making a 2-D index . . . |
| Rj += Rk | Rj is now a 2-D index, and has N**2 possible values. |
| R0 = W0 | Load W0 from memory |
| R1 = W1 | Load W1 from memory |
| R2 = W2 | Load W2 from memory |
| R3 = W3 | Load W3 from memory |
| R4 = X0 | Load X0 |
| . . . etc up to . . . | Load X, Y, Z values |
| R14 = Z2 | |
| R15 = Z3 | 16 Loads to get W0 – Z3 |
| R16 = LUT0[Rj] | Lookup weight for W0 in one indexed load |
| R17 = LUT1[Rj] | Lookup weight for W1 in one indexed load |
| . . . etc up to . . . | more loads to get weights |
| R31 = LUT15[Rj] | Lookup weight for Z3 in one indexed load |
| R0 *= R16 | R0 = W0 * its weight |
| R1 *= R17 | R1 = W1 * its weight |
| . . . etc up to . . . | 16 mpys to multiply all weights by values |
| R15 *= R31 | R15 = Z3 * its weight |
| R0 += R1 | sum the 16 weighted points |
| R0 += R2 | |
| . . . etc up to . . . | 15 adds to sum 16 weighted values |
| R0 += R14 | |
| R0 += R15 | all 16 weighted points summed. |
| R0 /= 2(N**3) | R0 = V |

Appendix #14 Hybrid-Linear-BiCubic Interpolation using 1-D LUT

| | |
|---|---|
| RP = W1 | Load W1 from memory |
| R2 = W2 | Load W2 from memory |
| R2 *= Rj | R2 = W2*j |
| R4 = LUT[Rj] | Lookup (N − j) in one indexed load |
| RP *= R4 | RP = (N − j)*W1 |
| RP += R2 | RP = (W2*j + (N − j)*W1) = N*P |

Repeat, very similarly, to get S along Z1–Z2 row, so we have

| | |
|---|---|
| RS = Z1 | Load Z1 from memory |
| R3 = Z2 | Load Z2 from memory |
| R3 *= Rj | R3 = Z2*j |
| RS *= R4 | RS = (N − j)*Z1 |
| RS += R3 | RS = (Z2*j + (N − j)*Z1)= N*S |

Do a Cubic interpolation to get Q along X row

| | |
|---|---|
| R0 = X0 | Load X0 from memory |
| R1 = X1 | Load X1 from memory R1 = d |
| R2 = X2 | Load X2 from memory |
| R3 = X3 | Load X3 from memory |
| R4 = LUT0[Rj] | Load weight for X0 from memory |
| R5 = LUT1[Rj] | |
| R6 = LUT2[Rj] | |
| R7 = LUT3[Rj] | |
| R0 *= R4 | multiply each X by its weight |
| R1 *= R5 | |
| R2 *= R6 | |
| R3 *= R7 | |
| R0 += R1 | |
| R0 += R2 | |
| R0 += R3 | R0 is the sum of all 4 weighted points typically = 2(N**3)V |
| R0 /= 2(N**2) | R0 = N*Q |

Repeat the above cubic code for the Y row to calculate point R.
Then, perform a cubic interpolation using points P, Q, R, S with t = k (in Rk) to get final point V.

Appendix #15 Hybrid-Linear-BiCubic Interpolation using 2-D LUT

| | |
|---|---|
| Rj *= N | Start making a 2-D index . . . |
| Rj += Rk | Rj is now a 2-D index, and has N**2 possible values. |
| R0 = W1 | Load W1 from memory |
| R1 = W2 | Load W2 |
| R2 = X0 | Load X0 |
| R3 = X1 | Load X1 |
| R4 = X2 | Load X2 |
| R5 = X3 | Load X3 |
| R6 = Y0 | Load Y0 |
| R7 = Y1 | Load Y1 |
| R8 = Y2 | Load Y2 |
| R9 = Y3 | Load Y3 |
| R10 = Z1 | Load Z1 |
| R11 = Z2 | Load Z2 |
| R12 = LUT0[Rj] | Lookup weight for W1 in one indexed load |
| R13 = LUT1[Rj] | Lookup weight for W2 in one indexed load |
| . . . etc up to . . . | |
| R23 = LUT15[Rj] | Lookup weight for Z2 in one indexed load |
| R0 *= R12 | R0 = W1 * its weight |
| R1 *= R13 | R1 = W2 * its weight |
| R2 *= R14 | R2 = X0 * its weight |
| . . . etc up to . . . | 12 mpys to multiply all weights by values |
| R11 *= R23 | R11 = Z2 * its weight |
| R0 += R1 | sum the 12 weighted points |
| R0 += R2 | |
| . . . etc up to . . . | 12 adds to sum 12 weighted values |
| R0 += R10 | |
| R0 += R11 | all 12 weighted points summed. |
| R0 /= 2(N**3) | R0 = V |

What is claimed is:

1. A method of determining an interpolated value for a point lying between second and third rows of an array comprising at least four rows of spatially related points each having respective values, said method comprising the steps of:

linearly interpolating between a first two points on said first row to determine a first value at a first location;

cubically interpolating between a second two points on said second row in accordance with the rate of change of values at said second two points on said second row to determine a second value at a second location;

cubically interpolating between a third two points on said third row in accordance with the rate of change of values at said third two points on said third row to determine a third value at a third location;

linearly interpolating between a fourth two points on said fourth row to determine a fourth value at a fourth location; said first, second, third and fourth locations forming a transverse row intersecting said point; and cubically interpolating between said second and third locations in accordance with the rate of change of values at said second and third locations determined according to said first and fourth values to determine said interpolated value.

2. A method according to claim 1 wherein said linear interpolating steps employ a look-up table which provides weightings for use in said interpolating steps.

3. A method according to claim 1 wherein said cubic interpolating steps employ a look-up table which provides weightings for use in said second and third row interpolating steps.

4. An interpolation component for determining an interpolated value for a point lying between second and third rows of an array comprising at least four rows of spatially related points each having respective values, said component comprising:

means instantiable to linearly interpolate between a first two points on said first row to determine a first value at a first location;

means instantiable to cubically interpolate between a second two points on said second row in accordance with the rate of change of values at said second two points on said second row to determine a second value at a second location;

means instantiable to cubically interpolate between a third two points on said third row in accordance with the rate of change of values at said third two points on said third row to determine a third value at a third location;

means instantiable to linearly interpolate between a fourth two points on said fourth row to determine a fourth value at a fourth location; said first, second, third and fourth locations forming a transverse row intersecting said point; and means instantiable to cubically interpolate between said second and third locations in accordance with the rate of change of values at said second and third locations determined according to said first and fourth values to determine said interpolated value.

5. A digital signal processor including the interpolation component of claim 4.

6. A graphics application including the interpolation component of claim 4.

7. A computer program product comprising computer program code stored on a computer readable storage medium for, when executed on a computer, determining an interpolated value for a point, the program code comprising an interpolation component as claimed in claim 4.

* * * * *